J. G. WEBB.
STILL.
A. 1. No. 5. Patented Apr. 7, 1838.
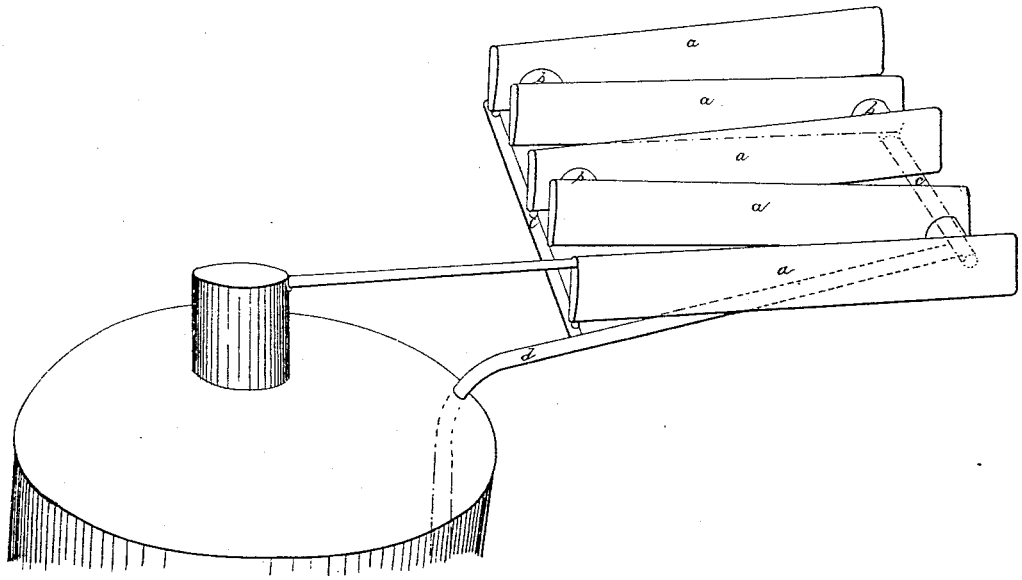
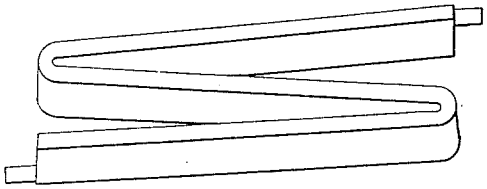
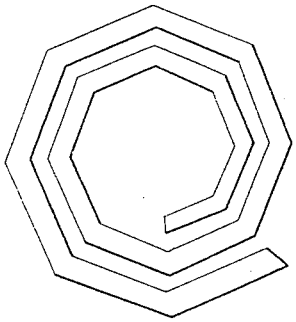
THE NORRIS PETERS CO., PHOTO-LITHO., WASHINGTON, D. C.

UNITED STATES PATENT OFFICE.

JOHN G. WEBB, OF ALBANY, NEW YORK.

IMPROVEMENT IN WORMS FOR STILLS.

Specification forming part of Additional Improvement No. 5, dated April 7, 1838, to Letters Patent dated February 11, 1834.

*To all whom it may concern:*

Be it known that I, JOHN G. WEBB, formerly of Waterford, in the county of Saratoga, in the State of New York, but now residing in the city of Albany, in the said State, did on the 11th day of February, in the year 1834, obtain Letters Patent of the United States for an Improvement in the Construction of a Worm for Stills, and that I have since devised an Improvement on the said Worm which I desire to have added to said Letters Patent to make a component part thereof; and I do hereby declare that the following is a full and exact description of my new improvement.

In the accompanying drawing, *a a a a* are flattened tubes, which may be made oval, or in any other form admitting of the approach of two of their opposite sides, so that when placed in the position in which they are to be used their vertical will much exceed their horizontal diameter. For instance, the tubes may first be made round, of a diameter of twelve inches, (more or less,) and shaped for use by flattening them on a board or otherwise to the thickness of the space (from one sheet to the other) of one inch, or more or less, as may be required. These tubes may be made of any length and stopped or closed up at both ends, and placed in a vertical position—that is, on the edge—either on their end, side by side, or one above the other, or in any form most convenient for the person using them. The steam or vapor communicates from one to the other by means of connecting-tubes *b b b*. The flattened tubes *a a*, which constitute the main body of the worm, are placed in an inclined position—say about a half-inch to a foot in length—so that any fluid formed by condensation may flow toward the lower end of each flattened tube. At each lower end is a hole perforated and a pipe, *c c*, of sufficient size to carry the condensed fluid in the main pipe *d*, which leads to the boiler and returns nearly to the bottom of the same. This arrangement shows that the liquor condensed, as well as the essential oils, (combined in whisky,) cannot pass over from one of these flattened tubes to the other, but that they are collected in and drawn off in these returning pipes from each flattened tube independently of the other, by which means each turn or flattened tube operates as a doubler or separate worm, and produces spirits or alcohol of any desired proof and purity with greater facility and safety than by any other worm or refrigerator of the known construction now in use.

What I claim as my invention, and as an improvement on the worms or refrigerators described in the Letters Patent above named, is—

The manner of constructing the worms herein set forth by making separate flattened tubes, placing such tubes vertically and in an inclined position for the condensed water and oils to lodge in, and at all the lowest points connecting-tubes placed to return the condensed fluid to the boiler, as herein explained and set forth and made known.

JOHN G. WEBB.

Witnesses:

JOHN KENNEY,

GEORGE JENKINS.